United States Patent
Honma et al.

(10) Patent No.: US 6,725,625 B1
(45) Date of Patent: Apr. 27, 2004

(54) PACKAGING APPARATUS

(75) Inventors: Katsumi Honma, Niigata (JP); Yasuhito Miyazawa, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 09/403,315

(22) PCT Filed: Feb. 12, 1999

(86) PCT No.: PCT/JP99/00634

§ 371 (c)(1),
(2), (4) Date: Oct. 20, 1999

(87) PCT Pub. No.: WO99/43551

PCT Pub. Date: Sep. 2, 1999

(30) Foreign Application Priority Data

Feb. 25, 1998 (JP) .......................... 10/043357

(51) Int. Cl.$^7$ .............................................. B65B 57/02
(52) U.S. Cl. ................................. 53/64; 53/505; 53/75
(58) Field of Search ................. 53/64, 70, 52, 53/505, 551, 75; 83/360, 364, 365, 370, 371; 156/368, 363, 362, 308.4

(56) References Cited

U.S. PATENT DOCUMENTS

| | | | | |
|---|---|---|---|---|
| 4,860,522 A | * | 8/1989 | Cherney | 53/451 |
| 5,014,493 A | * | 5/1991 | West | 53/410 |
| 5,732,529 A | * | 3/1998 | Dey et al. | 53/389.2 |
| 6,098,380 A | * | 8/2000 | Goodwin et al. | 53/451 |

FOREIGN PATENT DOCUMENTS

| | | |
|---|---|---|
| EP | 0 348 065 A | 12/1989 |
| JP | 44-5591 | 3/1969 |
| JP | 2-4626 | 1/1990 |
| JP | 2-19210 | 1/1990 |
| JP | 2-32929 | 2/1990 |
| JP | 6-298231 | 10/1994 |
| JP | 8-282637 | 10/1996 |

* cited by examiner

Primary Examiner—Rinaldi I. Rada
Assistant Examiner—John Paradiso
(74) Attorney, Agent, or Firm—McDermott, Will & Emery

(57) ABSTRACT

A film is drawn out from a film roll and continuously transferred, and margins of the film are overlapped and is sealed to produce a vertical seal by paired vertical seal rollers to shape the film into a tubular form. A product content is filled into a tube-shaped portion of the film, and the tube-shaped portion of the film is sealed to produce a lateral seal by paired lateral seal rollers and to thereby form a bag. At least one lateral seal roller of the lateral seal rollers is movably provided and there are provided a pusher device for pushing at least one seal roller against the other seal roller, a joint detector provided upstream in a film transfer direction of the paired lateral seal rollers for detecting a joint in the film, and a controller which reduces or eliminates a pushing force exerted by the pusher device when a specified time period has elapsed after detection of the joint in the film by the joint detector.

13 Claims, 6 Drawing Sheets

PACKAGING APPARATUS

TECHNICAL FIELD

The present invention relates to a packaging apparatus in which a continuously transferred film is gripped and heat-sealed by a pair of seal rollers.

BACKGROUND ART

Known examples of conventional filling/packaging machines for automatically filling and packaging such products as liquids, powders or viscous substances are described in Japanese Unexamined Patent Publication Nos. 2-46265 and 2-32929 published by the Japanese Patent Office. In such a apparatus, a portion of a film which is drawn out of a film web roll and continuously transferred is folded, both margins of the folded portion of the film are overlapped and vertically sealed by a pair of vertical seal rollers, a product is filled into the vertically sealed tube-shaped portion of the film, and the film is laterally sealed by a pair of lateral seal rollers, whereby bags containing the product are successively formed.

A film of a large length is generally used as a film web, which is a roll of the film used for packaging, to save the labor required for replacing the film and thereby allow for a high packaging work efficiency. For reasons related to the manufacture of such elongate film webs, a plurality of film strips of a specific length are joined together with tape, for example, to obtain a single film web.

As a consequence, film joints where the above-mentioned film strips are joined together occur in the film web during packaging operation. These joints are places where the film is interrupted and patches of the tape or other splicing parts are attached. Thus, when the packaging apparatus vertically seals the film by using the vertical seal rollers or laterally seals the film by using the lateral seal rollers, the tape or the like could become entangled between the seal rollers and, in certain cases, the tape or the like at the joints could melt and adhere to the seal rollers. Should this situation occur, it is likely to adversely affect subsequent sealing conditions.

A bag blank including such a film joint not only produces an awkward appearance but gives rise to a possibility that the filled product leaks from the bag blank. The bag blank of this kind should therefore be handled as a defective one, and there has been a demand to prevent leakage of product contents and a consequent damage to the apparatus.

In the light of the foregoing, it is an object of the present invention to provide a packaging apparatus which makes it possible to maintain good sealing performance by keeping joints of a film from being entangled to rule out the possibility of adhesion of a molten material to seal rollers, easily remove portions of the film including the joints as defective parts, and prevent leakage of product contents through the joints to keep thereby the packaging apparatus clean.

DISCLOSURE OF THE INVENTION

A film is drawn out from a film roll and continuously transferred, and margins of the film are overlapped and vertically sealed by paired vertical seal rollers to shape the film into a tubular form. A product content is filled into a tube-shaped portion of the film, and the tube-shaped portion of the film is laterally sealed by paired lateral seal rollers to thereby form a bag. A packaging apparatus is constructed such that at least one of the lateral seal rollers is movably provided and the packaging apparatus comprises a pusher for at least one seal roller against the other seal roller, a joint detector provided upstream in a film transfer direction of the paired lateral seal rollers for detecting a joint in the film, and a controller which reduces or eliminates a pushing force exerted by the pusher when a specified time period has elapsed after detection of the joint in the film by the joint detector. In this construction, the pushing force exerted by the pusher for the lateral seal rollers is eliminated when the specified time period has elapsed by the aforementioned joint detector.

As a result, sealing blades of the seal rollers are separated from each other and, thus, the joint is allowed to pass through without being laterally sealed, so that it is possible to prevent a molten material of the joint from adhering to the sealing blades of the seal rollers causing a subsequent deterioration in sealing performance.

The aforementioned controller reduces or eliminates the pushing force of the paired seal rollers for a specified time period after the joint detector has detected the joint in the film, and returns the paired seal rollers to their pushing condition so that they can grip and heat-seal the film after allowing the joint to pass through by advancing the film. For the controller of the packaging apparatus in this way, only a portion of the film including the joint is allowed to pass and heat seal operation is resumed subsequently, it is possible to carry out continuous packaging operation without stopping the feeding of the film.

Furthermore, the aforementioned controller calculates arrival time required by the joint to arrive at the seal rollers after the joint detector has detected the joint in the film, and reduces or eliminates the pushing force exerted by the pusher before the arrival time elapses. Since the packaging apparatus can be constructed so as to set timing at which the pushing force of the pusher for pushing the seal rollers is reduced or eliminated or timing at which the pushing force is recovered based on the calculated arrival time, the seal rollers can be separated from each other in such a way that they do not heat-seal only the portion of the film including the joint.

A packaging apparatus in which a film is drawn out from a film roll and continuously transferred, and while the film is gripped and heat-sealed by paired seal rollers to form a bag, a product content is filled into the bag by a product feeder comprises a joint detector provided upstream in a film transfer direction of the product feeder for detecting a joint in the film, and a controller which interrupts feeding of the product content by the product feeder when a specified time period has elapsed after detection of the joint in the film by the joint detector. Since the feeding of the product content is interrupted when the specified time period has elapsed detection of the joint in the film by the joint detector so that the product content is not fed into a portion of the film including the joint, it is possible to prevent leakage of the product content.

A packaging apparatus in which a film is drawn out from a film roll, margins of the film which is continuously transferred are overlapped and vertically sealed by paired vertical seal rollers to shape the film into a tubular form, a product content is filled into a tube-shaped portion of the film, the tube-shaped portion of the film is laterally sealed by paired lateral seal rollers, and a laterally sealed portion is cut by a cutter to thereby form a bag comprises a joint detector provided upstream in a film transfer direction of the cutter for detecting a joint in the film, and a controller which disables the cutter from performing its cutting operation when a specified time period has elapsed after detection of the joint in the film by the joint detector. Since a bag including a joint is not cut but allowed to proceed continuously, such a bag can be rejected as a bag having a fault from ordinary bags.

BEST MODE FOR CARRYING OUT THE INVENTION

Figure 1:
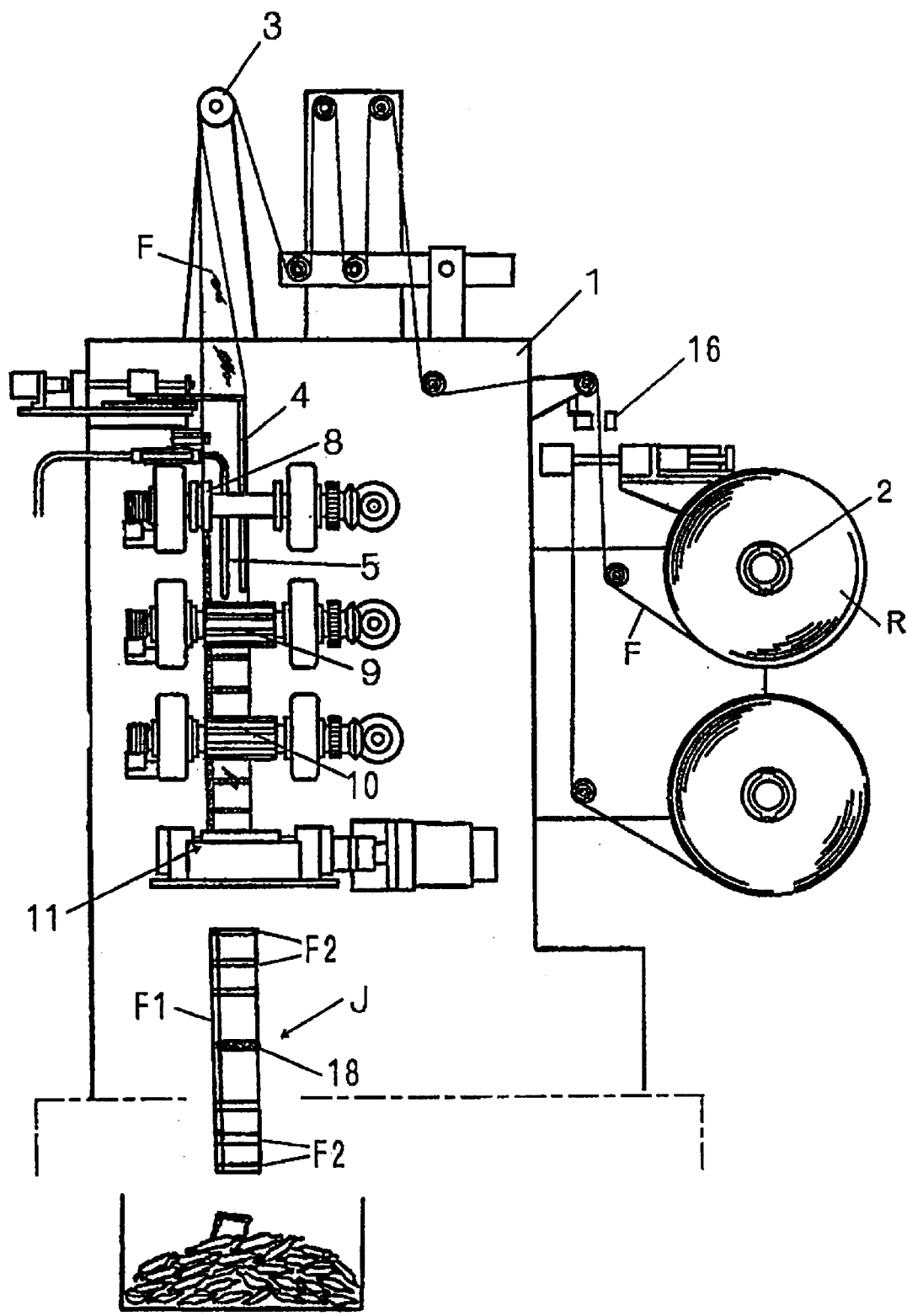
FIG. 1 is a front view showing a packaging apparatus according to an embodiment of the invention.

A mode of carrying out the present invention, or an embodiment thereof, is described below based on the drawings. FIGS. 1–11 illustrate a packaging apparatus according to the embodiment of the invention.

There is provided a retaining frame 2 on one side of a machine housing 1 of a filling/packaging machine, and a film roll R which is a roll of a film F is detachably mounted on the retaining frame 2.

At an upper part of the machine housing 1, there are provided a guide roller 3 for guiding the film F drawn out from the film roll R and a folding guide 4 which aligns margins of the film F and folds the film F. There is also provided a nozzle 5 which is located on the inside of the film F at the folding guide 5 and serves as a feeding part for filling a product content such as a liquid, powder or viscous substance. The nozzle 5 is connected to a product feed unit 7 including a pump 6 and other unillustrated elements, such as an on-off valve and shutter, and feeds the product content.

Further, paired vertical seal rollers 8 are provided on both sides of the folding guide 4 and the nozzle 5. While gripping the margins of the film F, the vertical seal rollers 8 produce a vertical seal F1 along a transfer direction of the film F to thereby shape the film F into a tubular form. These vertical seal rollers 8 not only produces the vertical seal F1 of the film F but act as feed rollers which grip and transfer the film F.

Paired lateral seal rollers 9 and 10 are provided downstream in the film F transfer direction of the vertical seal rollers 8. A bottom portion of a bag is formed by the lateral seal rollers 9 as they produce a lateral seal F2 at right angles to the vertical seal F1. Then, after the product content has been filled through the nozzle 5, another lateral seal F2 is produced at a top portion of the bag. Bags are formed successively in the above-described manner.

In this embodiment, there are provided vertically arranged two pairs of lateral seal rollers 9 and 10, and four sealing blades S are symmetrically fitted around a cylindrical surface of each of these lateral seal rollers 9 and 10. Lateral seals F2 are formed at specified intervals as the film is gripped between the sealing blades S. In this construction, the upper lateral seal rollers 9 are the first lateral seal rollers 9 which are heated by an unillustrated heater, while the lower lateral seal rollers 10 are the second lateral seal rollers 10 having no heater that press and shape each portion of the lateral seal F2 produced by the upper lateral seal rollers 9.

A cutter unit 11 for cutting the film F in the middle of each lateral seal F2, portion laterally sealed by the aforementioned first and second lateral seal rollers 9 and 10 is provided beneath the lower second lateral seal rollers 10. Including a rotary blade 12 which is turned by an unillustrated motor and a stationary blade 13 which is not rotated, the cutter unit 11 is so constructed that a cutting edge of the stationary blade 13 can be reciprocally moved relative to a cutting edge of the rotary blade 12. Specifically, the cutter unit 11 is constructed such that, when the stationary blade 13 is advanced toward the continuously turning rotary blade 12 (see FIG. 4), the cutting edge of the stationary blade 13 comes into contact with the cutting edge of the rotary blade 12 once every rotation of the latter, wherein the cutter unit 11 is in a ready-to-cut condition, and on the contrary, when the stationary blade 13 is retracted from the continuously turning rotary blade 12 (see FIG. 5), the cutting edge of the stationary blade 13 is set apart from the cutting edge of the rotary blade 12, wherein the cutter unit 11 is in an unable-to-cut condition.

Figure 2:
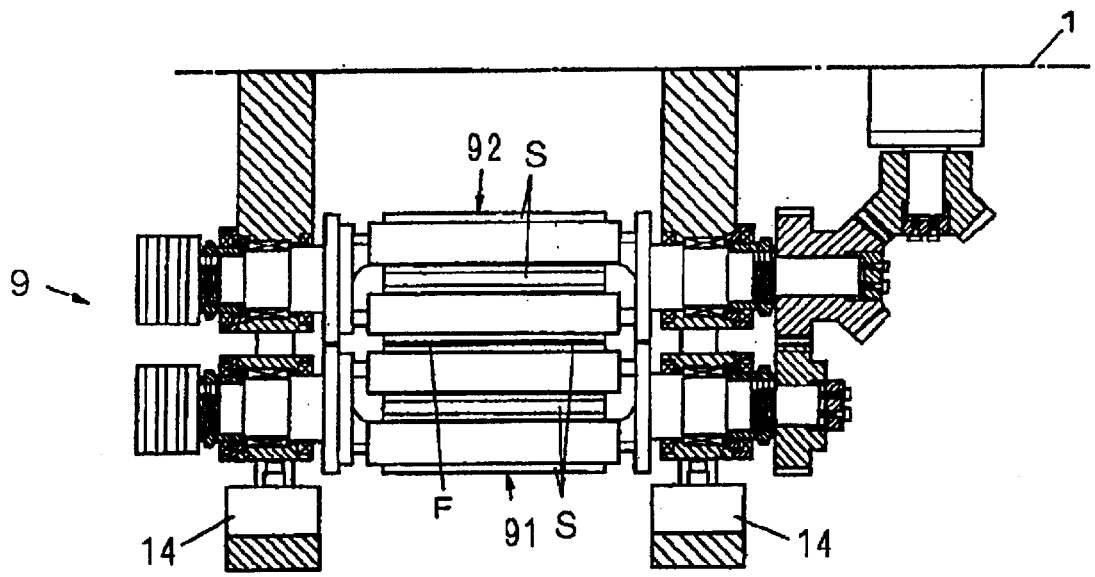
FIG. 2 is a top view of lateral seal rollers of the embodiment of the invention.
Figure 3:
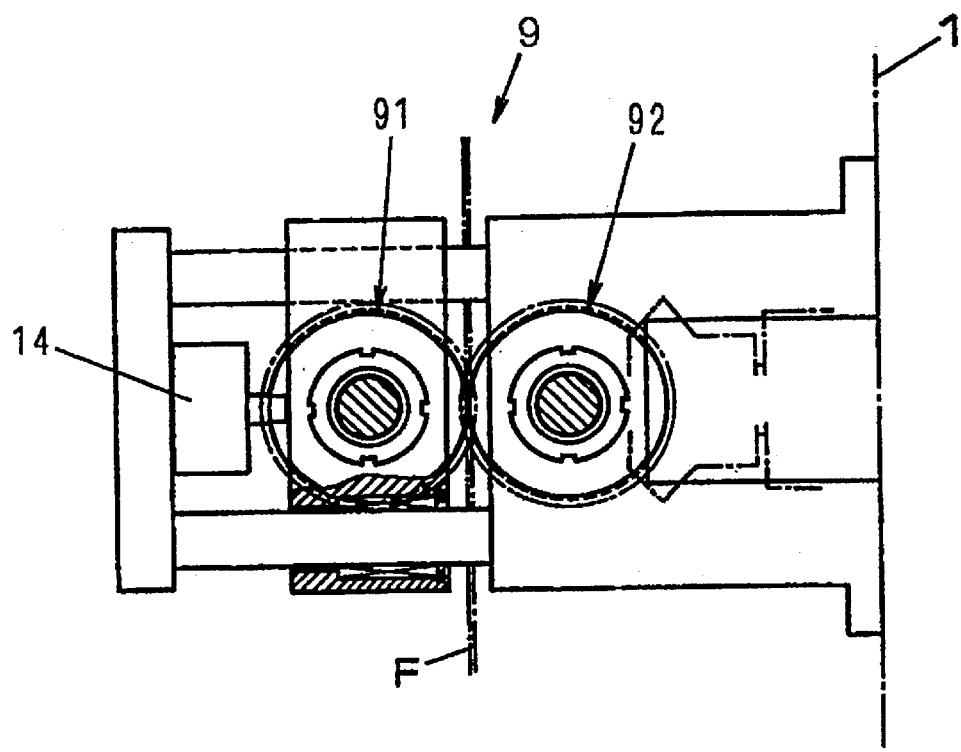
FIG. 3 is a side view of lateral seal rollers of the embodiment of the invention.
Figure 4:
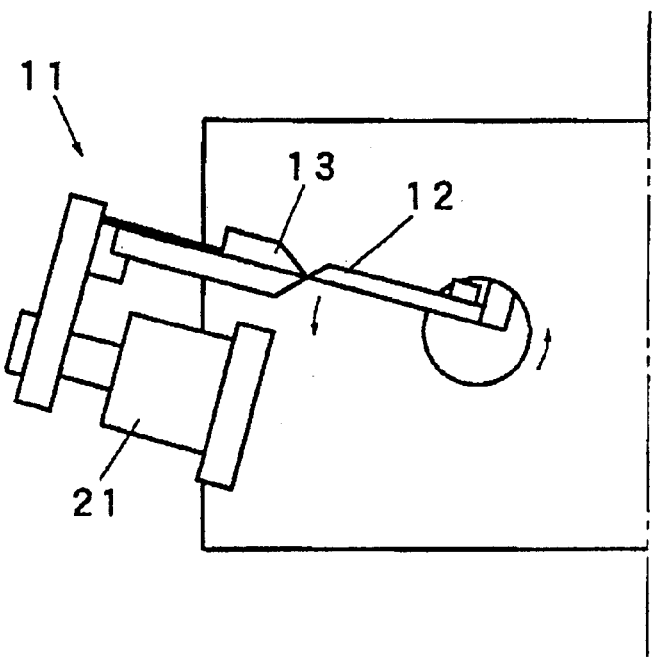
FIG. 4 is a diagram showing a ready-to-cut condition of a cutter unit of the embodiment of the invention.
Figure 5:
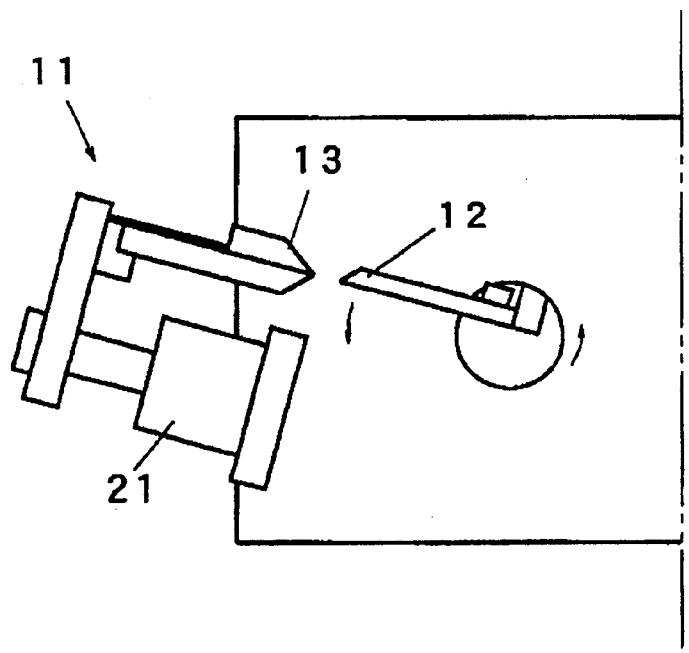
FIG. 5 is a diagram showing an unable-to-cut condition of the cutter unit of the embodiment of the invention.
Figure 6:
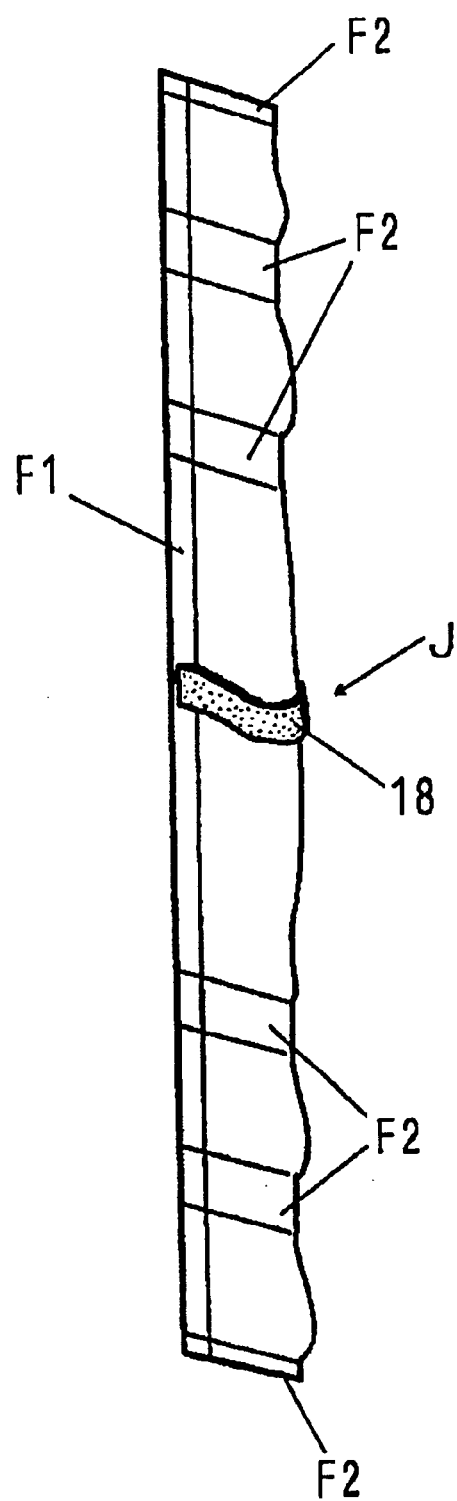
FIG. 6 is a diagram showing a bag blank including a film joint in the embodiment of the invention.

The earlier-mentioned first lateral seal rollers 9 include paired seal rollers 91 and 92 for gripping the film F as shown in FIGS. 2 and 3. At least one seal roller 91 is made movable and there is provided a pusher device 14 for pushing at least the seal roller 91 against the other seal roller 92.

The pusher device 14 is formed of a cylinder which is provided with a regulating device 15 formed of an electroneumatic regulator for regulating the pushing force of the lateral seal rollers 9 in accordance with film material and production conditions (film speed, sealing temperature) of the packaging apparatus so that the pushing force becomes equal to a specified value. The pusher device 14 is constructed in this fashion so that one seal roller 91 presses the film F against the seal roller 92 at the specified pushing force which would be appropriate for the film material and production conditions (film speed and sealing temperature) of the packaging apparatus.

In this invention, there are also provided a joint detector 16 which is located upstream in the film transfer direction of the aforementioned paired lateral seal rollers 9 for detecting a joint J in the film F and a controller 17 which reduces or eliminates the pushing force exerted by the pusher device 14 when a specified time period has elapsed after detection of the joint J in the film F by the joint detector 16.

In this embodiment, the joint detector 16 is formed of a photoelectric sensor, for example, which detects a vinyl tape at a film splicing part 18 as the joint J based on a difference in light transmittance between the film splicing part 18 and the film F, and located between the film roll R and guide roller 3 upstream in the film F transfer direction of the lateral seal rollers 9. A resultant detecting signal is output to the controller 17.

Figure 7:
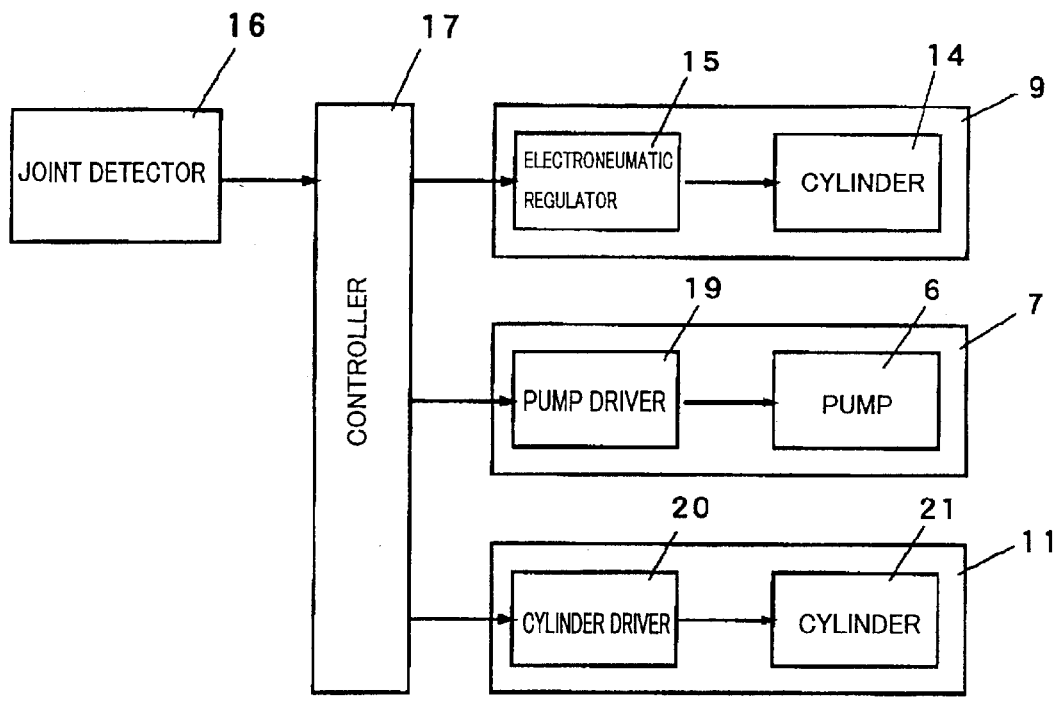
FIG. 7 is a block diagram showing the configuration of a controller of the embodiment of the invention.

As shown in FIG. 7, the controller 17 is configured such that it outputs a signal to the electroneumatic regulator constituting the regulating device 15 for regulating the pushing force when the specified time period has elapsed after the detecting signal was entered from the joint detector 16, to eliminate the pushing force exerted by the pusher device 14.

Specifically, the controller calculates an arrival time which is required by the joint J to arrive at the lateral seal rollers 9 since the joint J was detected and is set such that the pushing force exerted by the pusher device is eliminated slightly earlier than the arrival time of the joint J.

Here, the expression "when the specified time period has elapsed" refers to a time duration ranging from zero time, which implies a case wherein the pushing force is eliminated instantly when the joint detector 16 detects the joint J, up to the time required for the joint J to arrive at least at the location of the lateral seal rollers 9.

The aforementioned specified time period is calculated by the controller 17 in the following fashion. Expressing the film transfer distance from the mounting position of the joint detector 16 to the location of the lateral seal rollers 9 as L1 and the film feed speed of the packaging apparatus as v, the arrival time t1 required by the joint J to arrive at least at the location of the lateral seal rollers 9 after detection of the joint J in the film F by the joint detector 16 is obtained by $t1=L1/v$. If release start time ts1 is set to provide a particular time allowance preceding the arrival time t1 so that the pushing force exerted by the pusher device 14 is eliminated slightly earlier, and a release signal is output to the electroneumatic regulator constituting the regulating device 15, then it is possible to allow the joint J to pass without being heat-sealed because the paired seal rollers 91 and 92 are separated from each other before the joint J arrives at the lateral seal rollers 9.

Figure 8:
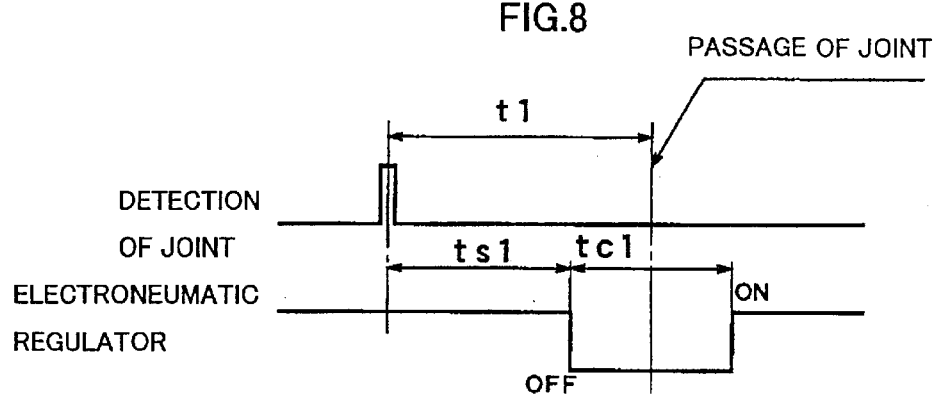
FIG. 8 is a time chart applicable to the embodiment of the invention.

Now, the invention is described more specifically with reference to FIG. 8. A specific release continuation time tc1 is set in relation to the release start time ts1 at which the pusher device 14 is caused to begin its pushing force release operation. When the release continuation time tc1 has elapsed, a reset signal is output to the electroneumatic regulator constituting the regulating device 15 and the pusher device 14 is caused to exert its pushing force again, whereby the paired seal rollers 91 and 92 are brought back to their pushing condition. As a consequence, the film F is gripped and returned to a condition in which it can be heat-sealed so that packaging operation can be continued.

A decision on how earlier a release start time ts1 should be set in relation to the aforementioned arrival time t1 and on how large a release continuation time tc1 should be set is made as appropriate. If the release continuation time tc1 which gives allowance time periods before and after the arrival time t1 is shortened, for example, a portion of the film F which is not heat-sealed by the lateral seal rollers 9 is shortened so that it becomes possible to minimize waste of the film F.

Further, there are provided the joint detector 16 which detects the joint J in the film F and the controller 17 which interrupts the feeding of the product content by the product feed unit 7 when a specified time period has elapsed after detection of the joint J in the film F by the joint detector 16 in this invention.

In this construction, it becomes necessary to provide the film joint detector 16 on the upstream side of the product feed unit 7 in the film transfer direction. In this embodiment, the aforementioned joint detector 16 formed of a photoelectric sensor, for example, is provided between the aforementioned film roll R and the guide roller 3, and the detecting signal is input to the controller 17.

As shown in FIG. 7, the controller 17 is configured such that it outputs a signal to a pump driver 19 for controlling rotation of the product feed unit 7, that is, a pump 6 in this case, when the specified time period has elapsed after the detecting signal was entered from the joint detector 16, to halt the rotation of the pump 6 and thereby interrupt the feeding of the product content.

Specifically, the controller 17 calculates an arrival time which is required by the joint J to arrive at the nozzle 5 since the joint J was detected, and the controller 17 is set such that it stops the rotation of the pump 6 slightly earlier than the arrival time.

Here, the expression "when the specified time period has elapsed" refers to a time duration ranging from zero time, which implies a case wherein the feeding of the product content by the product feed unit 7 is interrupted instantly when the joint detector 16 detects the joint, up to the time required for the joint J to arrive at least at the nozzle 5 serving as the feeding part of the product feed unit 7.

The aforementioned specified time period is calculated by the controller 17 in the following fashion. Expressing the film transfer distance from the mounting position of the joint detector 16 to the location of the nozzle 5 serving as the feeding part of the product feed unit 7 as L2 and the film feed speed of the packaging apparatus as v, the arrival time t2 required by the joint J to arrive at least at the location of the nozzle 5 after detection of the joint J in the film F by the joint detector 16 is obtained by $t2=L2/v$. If interrupt start time ts2 is set to provide a particular time allowance preceding the arrival time t2 so that the feeding of the product content by the product feed unit 7 is interrupted slightly earlier, and an interrupt signal is output at the interrupt start time ts2 to the pump driver 19, then it is possible to allow the joint J to pass without feeding the product content into a portion of the film F including the joint J because the pump 6 is stopped and the feeding of the product content is interrupted before the joint J arrives at the nozzle 5.

With this arrangement, the feeding of the product content is interrupted when the specified time period has elapsed after detection of the joint J by the joint detector 16 and, thus, the product content is not fed into the portion of the film F including the joint J. It is therefore possible to prevent leakage of the product content.

After the portion of the joint J in the film F has passed the nozzle 5 which serves as the feeding part of the product feed unit 7, a recovery signal is output to the pump driver 19 so that the pump begins to turn again and the feeding of the product content is recommenced, whereby the packaging operation is resumed. Consequently, the packaging operation can be carried out continuously without stopping the feeding of the film.

Figure 9:
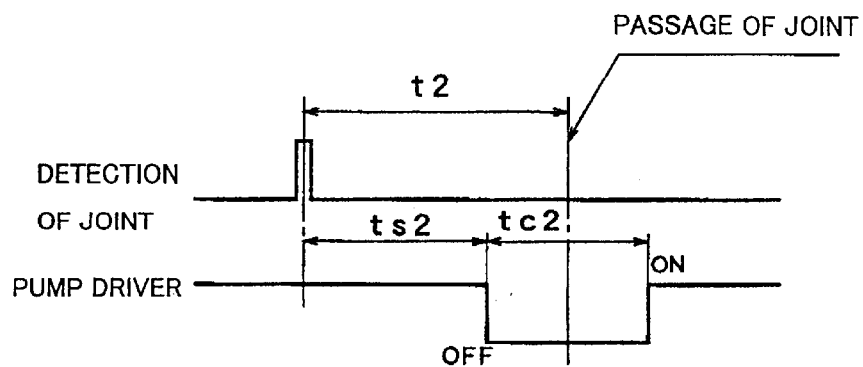
FIG. 9 is a time chart applicable to the embodiment of the invention.

The invention is described in further detail with reference to FIG. 9. A specific interrupt continuation time tc2 is set in relation to the interrupt start time ts2 at which the nozzle 5 constituting the product feed unit 7 is stopped. When the interrupt continuation time tc2 has elapsed, a feed start signal is output to the pump driver 19 and the pump 6 is caused to restart its product feed operation, whereby product content is filled in the film F and, as a consequence, the packaging operation can be carried out continuously without stopping the feeding of the film.

A decision on how earlier an interrupt start time ts2 should be set in relation to the aforementioned arrival time t2 and on how large a release continuation time tc1 should be set is made as appropriate. If the release continuation time tc1 which gives allowance time periods before and after the arrival time t2 will be extended, for example, it is possible to securely interrupt the feeding of the product content into the portion of the joint J in the film F and prevent leakage of the product content from the portion of the joint J in a reliable fashion.

Furthermore, there are provided the joint detector 16 which detects the joint J in the film F and the controller 17 which prohibits cutting operation of the cutter unit 11 when a specified time period has elapsed after detection of the joint J in the film F by the joint detector 16 in this invention.

In this construction, it becomes necessary to provide the film joint detector 16 on the upstream side of the cutter unit 11 in the film transfer direction. In this embodiment, the aforementioned joint detector 16 formed of a photoelectric sensor, for example, is provided between the aforementioned film roll R and the guide roller 3, and the detecting signal is output to the controller 17.

As shown in FIG. 7, the controller 17 is configured such that it outputs a signal to a cylinder driver 20 which causes the stationary blade 13 of the cutter mechanism 11 to be brought into contact with and separated from the rotary blade 12 when the specified time period has elapsed after the detecting signal was entered from the film joint detector 16, to activate a cylinder 21 to separate the cutting edge of the stationary blade 13 of the cutter unit 11 from the cutting edge of the rotary blade 12 to thereby interrupt the cutting operation. Specifically, the controller 17 calculates an arrival time which is required by the joint J to arrive at the cutter unit 11 since the joint J was detected, and the controller 17 is set such that it separates the cutting edge of the stationary blade from the cutting edge of the rotary blade to interrupt their cutting operation slightly earlier than the arrival time.

Here, the expression "when the specified time period has elapsed" refers to a time duration ranging from zero time, which implies a case wherein the cutter unit 11 is disabled from performing the cutting operation instantly when the joint detector 16 detects the joint, up to the time required for the joint J to arrive at least at the cutter unit 11.

The aforementioned specified time period is calculated by the controller 17 in the following fashion. Expressing the film transfer distance from the mounting position of the joint detector 16 to the location of the cutter unit 11 as L3 and the film feed speed of the packaging apparatus as v, the arrival time t3 required by the joint J to arrive at least at the location of the cutter unit 11 after detection of the joint J in the film F by the joint detector 16 is obtained by t3=L3/v. If cut prohibit time ts3 is set to provide a particular time allowance preceding the arrival time t3 so that the cutter unit 11 is disabled from performing the cutting operation slightly earlier, and a signal is output at the cut prohibit time ts3 to the pump driver 19, then it is possible to allow the joint J to pass without cutting a portion of the film including the joint J because the cutter unit 11 is disabled from performing the cutting operation before the joint J arrives at the cutter unit 11.

With this arrangement, the cylinder 21 is activated by the controller 17 to separate the cutting edge of the stationary blade 13 from the cutting edge of the rotary blade 12 of the cutter unit 11 so that the cutter unit 11 is disabled from performing the cutting operation when the specified time period has elapsed after detection of the joint J by the joint detector 16. Consequently, it is possible to remove portions of the film F including all joints J as defective parts from ordinary bag blanks under continuously operating conditions.

After the a portion of the joint J in the film F has passed through the cutter unit 11, the cylinder 21 is reactivated as a cut start signal is output to the cylinder driver 20. Consequently, the stationary blade 13 is advanced so that its cutting edge is brought into contact with the cutting edge of the rotary blade 12 of the cutter unit 11 to enable its cutting operation. As the cutter unit 11 restarts the cutting operation in this fashion, the packaging operation can be carried out continuously without stopping the feeding of the film. In addition, since each portion of the joint J in the film F is formed as a beltlike portion of the film F including the joint J separately from the ordinary bag blanks, it is possible to easily reject such portions as defective parts from the ordinary bag blanks.

Figure 10:
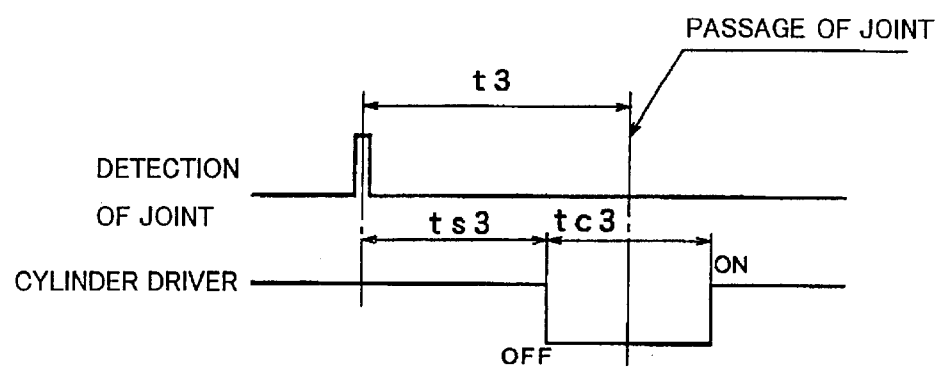
FIG. 10 is a time chart applicable to the embodiment of the invention.

The invention is described in further detail with reference to FIG. 10. A specific cut prohibit continuation time tc3 is set in relation to the aforementioned cut prohibit time ts3 at which the cutting operation of the cutter unit 11 is stopped. When the cut prohibit continuation time tc3 has elapsed, the cutting operation of the cutter unit 11 can be resumed by outputting the cut start signal to the cylinder driver 20 for activating the cylinder 21 of the cutter unit 11 and, therefore, it is possible to continuously perform the packaging operation.

A decision on how earlier a cut prohibit time ts3 should be set in relation to the aforementioned arrival time t3 and on how large a cut prohibit continuation time tc2 should be set is made as appropriate. If the cut prohibit continuation time tc3 which gives allowance time periods before and after the arrival time t3 is shortened, for example, each portion of the film F which includes the joint J and is cut away as a defective part is shortened so that it becomes possible to minimize waste of the film F.

In a case where an ordinary bag blank is formed as an uncut beltlike bag blank, it is preferable to grip a portion of the film F including the joint J and operate the cutter mechanism 11 in such a way that it cuts the film F once only at each of upstream and downstream positions of that portion and prohibit the cutting operation of the cutter unit 11 at the portion of the film F including the joint J, so that only those portions of the film F that include joints J are cut away from the ordinary continuous bag blank.

In the packaging apparatus of this invention, margins of the film F drawn out from the film roll R and continuously fed are overlapped and sealed by the paired vertical seal rollers 8 to produce a vertical seal F1 to thereby shape the film F into the tubular form, the product content is filled into the tube-shaped portion of the film F, and this tube-shaped portion of the film F is sealed by the paired lateral seal rollers 9 to produce lateral seals F2 to thereby form a bag. In this packaging apparatus, at least one seal roller 91 of the lateral seal rollers 9 is movably provided. The packaging apparatus is further provided with the pusher device 14 for pushing at least the seal roller 91 against the other seal roller 92, the product feed unit 7 for feeding the product content into the bag blank, the cutter unit 11 for cutting the laterally sealed portions F2, the joint detector 16 for detecting the joints J in the film F and the controller 17. When a joint J in the film F has been detected by the joint detector 16, the controller 17 sets first, second and third time periods as measured from the time of detection of the joint J, disables the cutter unit 11 from performing the cutting operation at the end of the first time period, interrupts the feeding of the product content by the product feed unit 7 at the end of the second time period, and reduces or eliminates the pushing force exerted by the pusher device 14 at the end of the a third time period.

Figure 11:
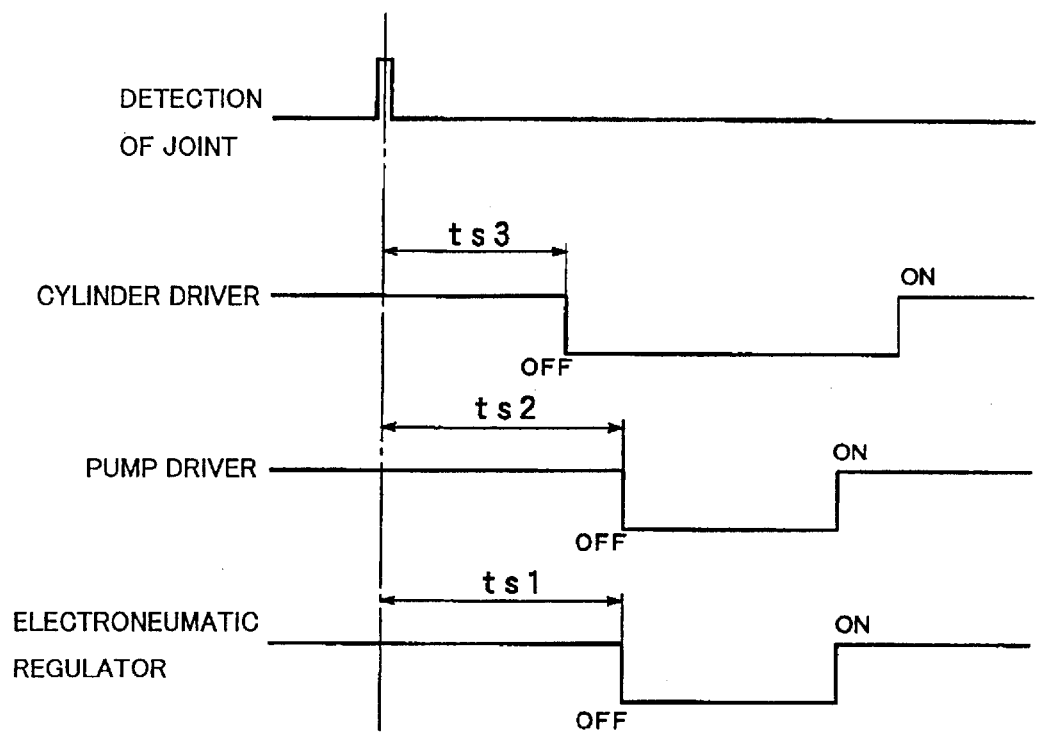
FIG. 11 is a time chart applicable to the embodiment of the invention.

In the above discussion, the first time period corresponds to the time (cut prohibit time) ts3 elapsed after the joint detector 16 has detected the joint J until the cutter unit 11 is brought to its unable-to-cut condition by activating its cylinder 21 and thereby separating the cutting edge of the stationary blade 13 from the cutting edge of the rotary blade 12, the second time period corresponds to the time (interrupt start time) ts2 elapsed after the joint detector 16 has detected the joint J until the feeding of the product content by the product feed unit 7 is interrupted, and the third time period corresponds to the time (release start time) ts1 elapsed after the joint detector 16 has detected the joint J until the pushing force of the lateral seal rollers 9 exerted by the pusher device 14 is eliminated. In this invention, their relationship is set by the controller 17 to satisfy ts3<(ts2, ts1) as depicted in FIG. 11.

To summarize, the controller 17 makes such a setting that, when the joint detector 16 detects a joint J in the film F, the cutting operation of the cutter unit 11 is prohibited at first after a specified time period has elapsed, then the feeding of the product content is interrupted, and the pushing force of the lateral seal rollers 9 is eliminated approximately at the same time as the interruption of the feeding of the product content. After the joint J has passed the nozzle 5 serving as the feeding part, the lateral seal rollers and the cutter unit, the above sequence is reversed wherein the pushing force of the lateral seal rollers 9 is recovered, and, approximately at the same time, the feeding of the product content restarted, and finally the cutter unit 11 is returned to a condition in which it can perform its cutting operation, so that each portion of the joint J is rejected without stopping the feeding of the film F.

The above-described arrangement also provides such an effect that the aforementioned bag blank including the joint J is ejected while being properly pulled downward, without being entangled in the lateral seal rollers 9 or the cutter unit 11.

Although the joint detector 16 for detecting the joints J in the film F detects the vinyl tape serving as the film splicing part 18 provided at each position where strips of the film F are joined together as a joint J in the film F based on the difference in light transmittance between the vinyl tape and film F in the above-described embodiment, the packaging apparatus may be constructed such that light is reflected by a highly reflective tape and the joint detector 16 detects the light reflected by the tape, or an electrically conductive element is attached to each joint J in the film F and the joint detector 16 detects this electrically conductive element, for example.

Further, the film splicing part 18 itself like the vinyl tape for joining the strips of the film F may be provided as a target element for detecting each joint J, or the film F may be constructed by providing a dedicated target element for detecting each joint J in addition to the film splicing part 18 for joining the strips of the film F. Furthermore, such a target element need not necessarily be attached exactly at the location of each joint J but may be attached in the vicinity of each joint J.

While the present embodiment has such a construction that one seal roller 91 of the lateral seal rollers 9 is provided movably with respect to the other seal roller 92 and the seal roller 91 is separated from the other seal roller 92 by removing the pushing force of the seal roller 91 to thereby keep each portion of the joint J from being entangled in the lateral seal rollers 9 or to prevent a resultant molten material from adhering thereto, it will become possible to prevent the molten material, which could occur at the portion of the joint J, from adhering to the vertical seal rollers 8 if the invention is applied to the vertical seal rollers 8. In this case, unillustrated paired transfer rollers for feeding the film are provided and the paired vertical seal rollers 8 are separated from each other while the film is gripped and transferred by the transfer rollers, whereby the joint J can be passed by feeding the film F without vertically sealing the portion of the joint J.

Although the seal rollers 91 and 92 are separated from each other by eliminating the pushing force (zero pushing force) exerted by the pusher device 14 for pushing the lateral seal rollers 9 in the foregoing embodiment, the seal rollers 91 and 92 need not necessarily be separated from each other. In one alternative, the pushing force of the pusher device 14 may be controlled to a specified value by the electroneumatic regulator constituting the regulating device 15 so that the pushing force is reduced to such a degree that is not strong enough to press and break the joint J in the film F.

Furthermore, the arrival times are calculated based on the film transfer distances L1, L2 and L3 from the mounting position of the joint detector 16 to the locations of the seal rollers, the feeding part of the product feed unit and cutter unit, respectively, and the aforementioned controller determines release/reset timing for the pusher device for pushing the seal rollers, product feed interrupt/restart timing for the product feed unit and cutting activate/deactivate timing for cutter mechanism based on the arrival times t1, t2 and t3 in the present embodiment. This construction may be modified such that various timings are determined with the provision of an unillustrated delay device like a timer without performing such calculations.

Furthermore, although the product feed unit is constructed of the pump and the pump driver for driving the pump in the packaging apparatus of this embodiment which is intended to fill a liquid, for example, the construction of the product feed unit may be modified as appropriate depending on the type of the product content (liquid, powder or viscous substance) to be filled.

As thus far described, the present invention provides a packaging apparatus which makes it possible to heat-seal portions of the film including joints and keep such joint portions from being entangled between seal rollers, prevent a molten material from adhering to the seal rollers and thereby maintain good sealing performance according to the present invention, to easily reject portions of the film including the joints as defective parts, and to prevent leakage of product contents through the joints to thereby keep the packaging apparatus clean.

INDUSTRIAL APPLICABILITY

The present invention is effective when a film roll including joints where film strips are joined together by a tape, for instance, is used in a packaging apparatus.

We claim:

1. A packaging apparatus in which a film drawn out from a film roll is gripped and sealed while said film is continuously transferred, comprising:

a first set of paired seal rollers and a second set of paired seal rollers, each of said first set and second set of paired seal rollers being configured to grip and transfer said film and at least one of said seal rollers of said second set of paired seal rollers being movably provided;

a pusher for pushing said at least one seal roller of said second set of paired seal rollers against the other seal roller of said second set of paired seal rollers;

a joint detector provided upstream in a film transfer direction of said second set of paired seal rollers for detecting a joint in said film; and a controller configured to output at least one signal to command said pusher to reduce or eliminate a pushing force exerted by said pusher when a specified time period has elapsed after detection of the joint in said film by said joint detector to controllably reduce or eliminate sealing of said film by said second set of paired seal rollers in an area of said film corresponding to the detected joint during a time at which said first set of paired seal rollers to continuously transfer said film, including an area of said film corresponding to the detected joint, through said second set of paired seal rollers, and to reset said pusher to enable normal operation following passage of said joint in said film past said second set of paired seal rollers.

2. A packaging system as set forth in claim 1 which is characterized in that said pusher is provided with a regulator for regulating the pushing force of said seal rollers.

3. A packaging system as set forth in claim 1 which is characterized in that said controller reduces or eliminates the pushing force of said paired seal rollers for a specified time period after said joint detector has detected the joint in said film, and returns said paired seal rollers to their pushing condition so that they can grip and heat-seal said film after allowing said joint to pass through by advancing said film.

4. A packaging system as set forth in claim 1 which is characterized in that said controller calculates arrival time required by said joint to arrive at said seal rollers after said joint detector has detected the joint in said film, and reduces or eliminates the pushing force exerted by said pusher before said arrival time elapses.

5. A packaging apparatus in which a film is drawn out from a film roll, margins of said film are overlapped and vertically sealed by paired vertical seal rollers to shape said film into a tubular form, a product content is filled into a tube-shaped portion of said film, and the tube-shaped portion of said film is laterally sealed by paired lateral seal rollers to thereby form a bag, said packaging apparatus being characterized in that at least one of said lateral seal rollers is movably provided and said packaging apparatus comprises:

paired vertical seal rollers configured to grip and vertically seal said overlapped margins of said film, paired lateral seal rollers configured to grip and laterally seal said overlapped film, at least one of said lateral seal rollers being movably provided;

a pusher for pushing said at least one of said paired lateral seal rollers against the other of said paired lateral seal rollers;

a joint detector provided upstream in a film transfer direction of said paired lateral seal rollers for detecting a joint in said film; and a controller configured to output at least one signal to command said pusher to reduce or eliminate a pushing force exerted by said pusher when a specified time period has elapsed after detection of the joint in said film by said joint detector to controllably reduce or eliminate sealing of said film by said paired lateral seal rollers in an area of said film corresponding to the detected joint during a time at which said paired vertical seal rollers continuously transfer said film, including an area of said film corresponding to the detected joint, through said paired lateral seal rollers, and to reset said pusher to enable normal operation following passage of said detected joint in said film past said paired lateral seal rollers.

6. A packaging apparatus in which a film is drawn out from a film roll and heat-sealed by paired seal rollers to form a bag to permit filling of the bag by a product content comprising:

paired seal rollers configured to grip and heat-seal said film to form a bag;

a product feeder comprising a feeding part configured to feed a product content into said bag;

a joint detector provided upstream in a film transfer direction of the feeding part of said product feeder for detecting a joint in said film; and a controller configured to output at least one signal to command said product feeder to interrupt feeding of the product content by said product feeder when a specified time period has elapsed after detection of the joint in said film by said joint detector to prevent feeding of the product content into a portion of said film or said bag comprising the joint during a time at which said paired seal rollers continuously transfer said film, including an area of said film corresponding to the detected joint, through said paired seal rollers and said product feeder, and to reset said product feeder to enable normal operation following passage of said detected joint in said film past said product feeder.

7. A packaging system as set forth in claim 6 which is characterized in that said controller interrupts the feeding of the product content by said product feeder for a specified time period after said joint detector has detected the joint in said film, and restarts the feeding of the product content after allowing said joint to pass through by advancing said film.

8. A packaging apparatus as set forth in claim 6 which is characterized in that said controller calculates arrival time required by said joint to arrive at the feeding part of said product feeder after said joint detector has detected the joint in said film, and interrupts the feeding of the product content before said arrival time elapses.

9. A packaging apparatus in which a film is drawn out from a film roll, margins of said film are overlapped and vertically sealed to shape said film into a tubular form, product content is filled into a tube-shaped portion of said film, the tube-shaped portion of said film is laterally sealed, and a laterally sealed portion is cut to thereby form a bag, said packaging apparatus comprising:

paired vertical seal rollers configured to grip and vertically seal said overlapped margins of said film to form a tubularly-shaped film;

paired lateral seal rollers configured to grip and laterally seal said tubularly-shaped film;

a product feeder comprising a feeding part configured to feed a product content into said laterally sealed tubularly-shaped film;

a cutter configured to laterally cut a laterally sealed portion of said film;

a joint detector provided upstream in a film transfer direction of said cutter for detecting a joint in said film; and a controller configured to output at least one signal to disable said cutter and prevent said cutter from performing its cutting operation when a specified time period has elapsed after detection of the joint in said film by said joint detector to prevent cutting of the laterally sealed portion in an area corresponding to the detected joint during a time at which said paired vertical seal rollers and said paired lateral seal rollers continuously transfer said film, including an area of said film corresponding to the detected joint, through said cutter, and to reset said cutter to enable normal operation of said cutter following passage of said detected joint in said film past said cutter.

10. A packaging system as set forth in claim 9 which is characterized in that said controller disables said cutter from performing its cutting operation for a specified time period after said joint detector has detected the joint in said film, and enables the cutting operation of said cutter after allowing said joint to pass through by advancing said film.

11. A packaging system as set forth in claim 9 which is characterized in that said controller calculates arrival time required by said joint to arrive at said cutter after said joint detector has detected the joint in said film, and disables said cutter from performing its cutting operation for a specified time period before said arrival time elapses.

12. A packaging system in which a film is drawn out from a film roll, margins of said film which is continuously transferred are overlapped and vertically sealed by paired vertical seal rollers to shape said film into a tubular form, a product content is filled into a tube-shaped portion of said film, and the tube-shaped portion of said film is laterally sealed by paired lateral seal rollers to thereby form a bag, said packaging system being characterized in that at least one of said lateral seal rollers is movably provided and said packaging system comprises:

a pusher for pushing said at least one seal roller against the other seal roller;

a product feeder for feeding the product content into said bag;

a cutter for cutting a laterally sealed portion;

a joint detector for detecting a joint in said film; and a controller which sets first, second and third time periods as measured from the time of detection of the joint when it has been detected by said joint detector, disables said cutter from performing its cutting operation at the end of said first time period, interrupts feeding of the product content by said product feeder at the end of said second time period, and reduces or eliminates a pushing force exerted by said pusher at the end of said third time period.

13. A packaging system as set forth in claim 12 which is characterized in that said controller allows said joint to pass through said feeding part, said lateral seal rollers and said cutter by advancing said film, returns said paired seal rollers to their pushing condition so that they can grip and heat-seal said film, restarts the feeding of the product content by said product feeder, and then enables the cutting operation of said cutter.

* * * * *